US007007906B2

(12) United States Patent
Slatter

(10) Patent No.: US 7,007,906 B2
(45) Date of Patent: Mar. 7, 2006

(54) ADJUSTABLE TOP MOUNT

(75) Inventor: Stephen O. Slatter, Sunrise, FL (US)

(73) Assignee: Taco Metals, Inc., Miami, FL (US)

( * ) Notice: Subject to any disclaimer, the term of this patent is extended or adjusted under 35 U.S.C. 154(b) by 5 days.

(21) Appl. No.: 10/852,054

(22) Filed: May 24, 2004

(65) Prior Publication Data

US 2005/0056751 A1 Mar. 17, 2005

Related U.S. Application Data

(60) Provisional application No. 60/473,661, filed on May 27, 2003.

(51) Int. Cl.
*E04G 3/00* (2006.01)

(52) U.S. Cl. .................... 248/276.1; 43/21.2; 114/255

(58) Field of Classification Search ............. 248/276.1, 248/278.1, 279.1, 282.1, 287.1; 43/21.2, 43/27.4; 114/255, 364
See application file for complete search history.

(56) References Cited

U.S. PATENT DOCUMENTS

| | | | | |
|---|---|---|---|---|
| 3,091,133 | A * | 5/1963 | Hoeger | 74/826 |
| 4,549,727 | A * | 10/1985 | Kozar | 269/70 |
| 5,445,102 | A * | 8/1995 | Rupp | 114/255 |
| 6,505,431 | B1 * | 1/2003 | Christian et al. | 43/21.2 |
| 6,591,541 | B1 * | 7/2003 | Cummings | 43/21.2 |
| 6,668,745 | B1 * | 12/2003 | Slatter | 114/255 |
| 6,851,654 | B1 * | 2/2005 | Slatter | 248/314 |
| 2003/0089021 | A1 * | 5/2003 | Miller | 43/21.2 |

* cited by examiner

*Primary Examiner*—Ramon O Ramirez
(74) *Attorney, Agent, or Firm*—Robert M. Schwartz

(57) ABSTRACT

An adjustable top mount is disclosed including an adjustable head adapted to receive an arm adapter, the adjustable head having teeth separated by spaces, the arm adapter having a support tube adapted to receive an outrigger boom, a knob assembly operatively engaged to the adjustable head, wherein the knob assembly releasably secures the arm adapter in a position of a plurality of positions, a baseplate operatively engaged to the adjustable head, and a tapered pin slidably positioned within a portion of the baseplate, the tapered pin releasably engaged to the teeth and releasably movably positioned in a space of the spaces.

17 Claims, 7 Drawing Sheets

ADJUSTABLE TOP MOUNT

CROSS-REFERENCE TO RELATED APPLICATIONS

This application claims the benefit of U.S. Provisional Application Ser. No. 60/473,661, filed on May 27, 2003, entitled ADJUSTABLE TOP MOUNT.

TECHNICAL FIELD OF THE INVENTION

This invention relates to the field of sport fishing, and particularly to an outrigger mounting system having a adjustable outrigger mounting arm assembly capable of rotational movement.

BACKGROUND OF THE INVENTION

Saltwater sport fishing typically consists of anglers positioned on boats that are then dispatched to prolific offshore fishing areas. One useful method of catching game fish involves a technique known as trolling. Trolling is the practice of baiting hooks that are subsequently lowered and dragged behind the stern of a slow moving vessel by the angler. In order to increase the chances of hooking a fish, it is beneficial to have as many lines in the water as possible. To a game fish, the wake of a vessel generally creates the appearance of a large school of smaller fish to be preyed upon. The angler can strategically simulate bands of straggling or displaced fish from the school with numerous baited lines. These simulated straggling fish are misinterpreted to be the disadvantaged and weakened fish that game fish frequently utilize as a food source.

As stated above, an angler will often drag as many baited lines from behind the boat as possible, thereby increasing the chances of hooking a fish. However, as more baited lines are used, the probability of the lines becoming entangled with one another increases. This is a problem that occurs in a variety of situations, such as with a narrow beam boat or any boat that is in the process of being turned. As a result, sport fishing outriggers have been developed to assist in keeping the various lines separated. However, the positioning and lowering of outrigger booms presents additional problems of rotational movement and preventing the booms from contacting the water. This problem has brought forth various attempts to create mechanisms to rotate the boom and that prevent the boom from contacting the water.

Outriggers consist of a long pole, or boom, having one end secured to the boat with deployment resulting from an outward lateral extension of the boom from a side of the boat. Baited fishing lines often have integrated release clips that are attached to the outriggers, thereby providing sufficient separation between the lines to prevent tangling. When a fish is hooked on the bait line, the line clip releases from the outrigger, thus allowing the angler to reel in the fish.

Outriggers are required to be freely stowable to a position beside the boat for close quarters operation and docking. For practicality, the outrigger should be swung laterally outward to its deployed position. The prior art includes various types of mounting schemes including outrigger units for horizontal and vertical mounting, on center consoles, flybridges, half towers, tuna towers, radar arches, and/or T-tops. Prior patents disclose a variety of methods for mounting, deploying, and locking such outriggers into place (see e.g. U.S. Pat. Nos. 5,445,102 and 3,724,791), with each having distinct drawbacks. Such drawbacks include overall mechanical complexity; powered operation; non-durable construction;

and/or ineffective position adjustment and locking mechanisms that slip and/or wear out.

Although the prior art discloses a vast array of mechanisms and mounting locations for outrigger mounts, the prior art fails to disclose or otherwise teach a simple and durable outrigger system having an effective boom locking mechanism, a boom stop that prevents excessive lowering, and a positionable arm that allows for both vertical and rotational movement of the boom. This is of particular importance with respect to the excessive forces experienced by an outrigger mount during operation. Both wind and movement (of the boat) impart forces on to a boom, thereby increasing the stresses on the outrigger mount of the boom. Generally, the longer the boom, the greater the stresses at the outrigger mount. If the position adjustment and/or locking mechanism were to succumb to these increases in stress, the outrigger might swing in an unrestricted manner during a critical maneuver or operation, with potentially disastrous or life-threatening results to passengers of the outrigger equipped boat or other surrounding vessels. Accordingly, an outrigger assembly with a novel position adjustment and locking mechanism is disclosed that alleviates this and other shortcomings of the prior art.

As described in the aforementioned prior art, the mounting and operation of a conventional outrigger system can be complicated. Booms of considerable length must be stored in an upright position to allow the vessel to pass beneath low bridges, as well as for close quarters maneuvering. Similarly, should the boat pass under or through an object that limits clearance, the boom must be vertically lowered and/or rotated in from the extended position on a non-vertical plane. Preferably the outrigger mount not only rotates in the non-vertical plane in a 360° arrangement from a position on the vessel, but also allows the boom attachment arm to be easily raised and lowered in a vertical plane. Thus, in the operation of a one way of several conventional outrigger booms, the boom is inserted into a vertically adjustable boom attachment arm, usually as part of an elbow, and locked into position with a locking pull pin. The outrigger boom is then rotated in a non-vertical plane to a point determined by the user. Additionally, either before or after the boom is rotated in the non-vertical plane, the user may raise or lower the boom within a vertical plane with respect to the outrigger mount.

Accordingly, what is lacking is an outrigger assembly having an effective boom locking mechanism, and a positionable arm that allows for both vertical and horizontal rotational movement of the boom to eliminate the complicated and problematic outrigger mounts commonly used to support outrigger booms.

SUMMARY OF THE INVENTION

The present invention eliminates the above-mentioned needs for an outrigger assembly by providing an outrigger assembly having a positionable arm that allows for both vertical and horizontal rotational movement of the boom.

In accordance with the present invention, there is provided an adjustable top mount, including an adjustable head adapted to receive an arm adapter, the adjustable head having teeth separated by spaces, the arm adapter having a support tube adapted to receive an outrigger boom, a knob assembly operatively engaged to the adjustable head, wherein the knob assembly releasably secures the arm adapter in a position of a plurality of positions, a baseplate operatively engaged to the adjustable head, and a tapered pin slidably positioned within a portion of the baseplate, the tapered pin releasably engaged to the teeth and releasably movably positioned in a space of the spaces.

DETAILED DESCRIPTION OF THE INVENTION

Figure 1:
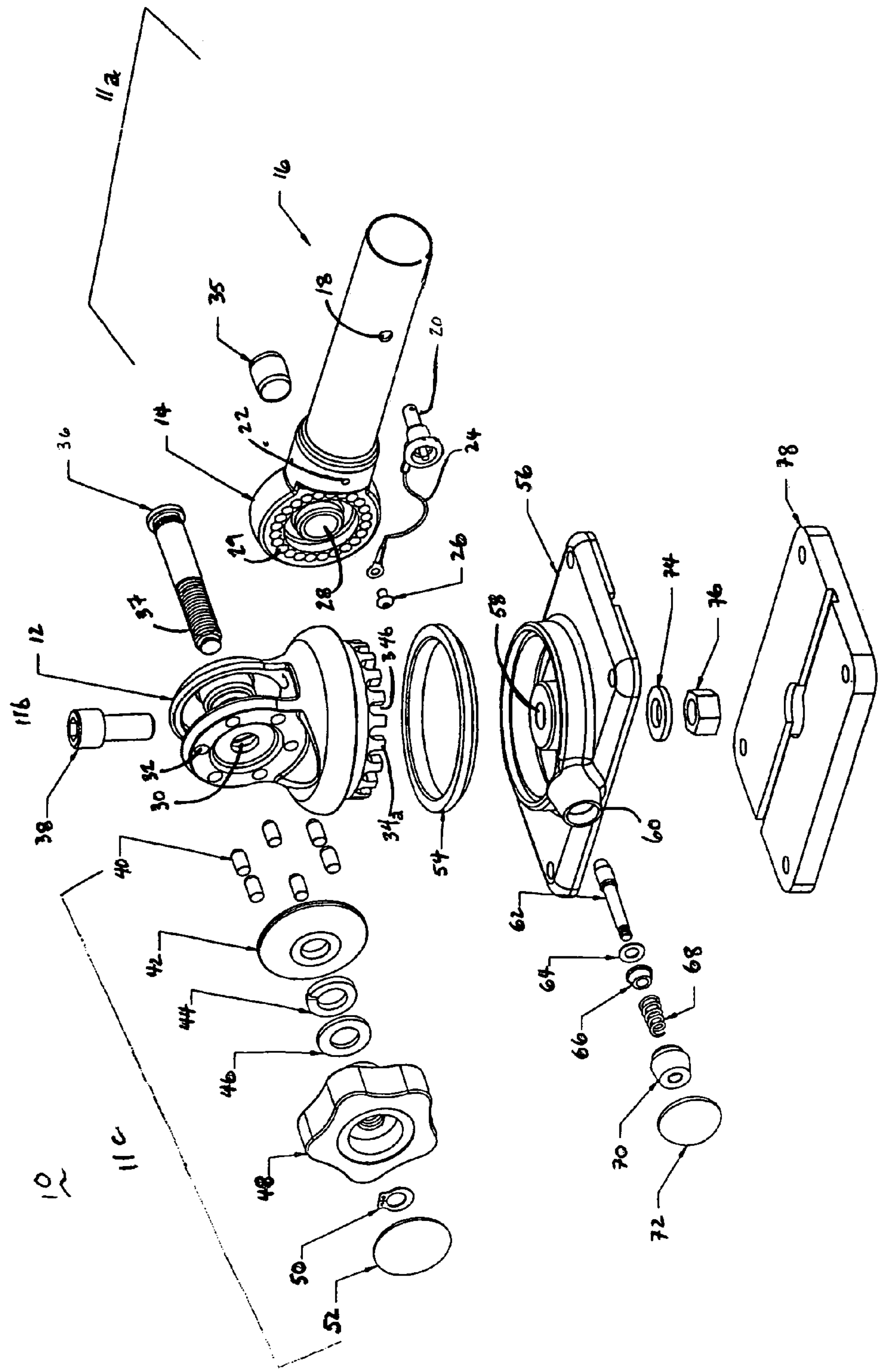
FIG. 1 is an exploded isometric view illustration of the preferred embodiment of the present invention.

Referring now to FIG. 1, the preferred embodiment of the present invention is illustrated as adjustable top mount 10. Adjustable top mount 10 includes arm assembly 11*a* and head assembly 11*b*.

As is shown in FIG. 1, arm assembly 11*a* further includes an arm adapter 14 operatively engaged to a support tube 16. It is preferred that support tube 16 be employed to engage a fishing accessory, such as an outrigger boom. Such a fishing accessory can be secured within support tube 16 by way of a pull pin 20 that passes at least partially through a hole 18 in support tube 16 and engages the fishing accessory. Pull pin 20 incorporates a lanyard cable 24 that is preferably secured to arm assembly 11*a* through a cable screw 26 that passes at least partially through lanyard cable 24 and into screw hole 22 on arm assembly 11*a*, adjacent to arm adapter 14.

Arm adapter 14 includes a pivot bolt bore 28 for receiving a pivot bolt 36 therethrough (discussed in detail below) and a plurality of detents 29. Plurality of detents 29 is preferably provided to receive bullets 40 from head assembly 11*b*, as discussed below.

Head assembly 11*b* is provided to operatively engage arm adapter 14 of arm assembly 11*a*. Head assembly 11*b* includes adjustable head 12 having a pivot bolt bore 30 and detent bores 32. Adjustable head 12 further includes teeth 34*a* with spaces 34*b* positioned there between. Prior to receiving arm adapter 14, adjustable head 12 is secured to a baseplate 56 by way of an adjustable headbolt 38, as detailed below.

Adjustable head 12 accommodates arm adapter 14 into a position that permits alignment of pivot bolt bore 28 and pivot bolt bore 30. In this way, pivot bolt 36 can be passed through both pivot bolt bore 28 and pivot bolt bore 30 to maintain the orientation of adjustable head 12 to arm adapter 14. Preferably, pivot bolt bore 28 accommodates a pivot bushing 35 for pivot bolt 36 to pass through, so as to reduce friction between pivot bolt 36 and pivot bolt bore 28.

Pivot bolt 36 incorporates a threaded portion 37 to engage a knob assembly 11*c* upon passage through pivot bolt bore 30. Knob assembly 11*c* includes a threaded lobe knob 48, a thrust washer 42, and bullets 40. Once pivot bolt 36 passes through pivot bolt bore 30, thrust washer 42 is positioned thereon, with a spring washer 44 and a washer 46 positioned adjacent thereto, and is slid towards detent bores 32 of adjustable head assembly 12.

As thrust washer 42 is positioned adjacent to detent bores 32, bullets 40 aligned in corresponding detent bores 32. Thus, as thrust washer 42 approaches detent bores 32, bullets 40 are kept from falling out of their respective detent bores 32. Bullets 40 pass through detent bores 32 and rest in respective detents of plurality of detents 29. As threaded lobe knob 48 engages threaded portion 37 of pivot bolt 36, thrust washer 42 pushes bullets 40 further through their respective detent bores 32 and deeper into their respective detents of plurality of detents 29. Appropriate tightening of threaded lobe knob 48 ensures that the desired orientation of arm adapter 14 with respect to adjustable head 12 is maintained. Loosening of threaded lobe knob 48 permits the user to alter the orientation of arm adapter 14 with respect to adjustable head 12. A "C" clip 50 can be used to prevent over-loosening of threaded lobe knob 48, thereby precluding threaded lobe knob 48 from disengaging from pivot bolt 36. A plug 52 can be employed to prevent access to "C" clip 50.

Figure 2:
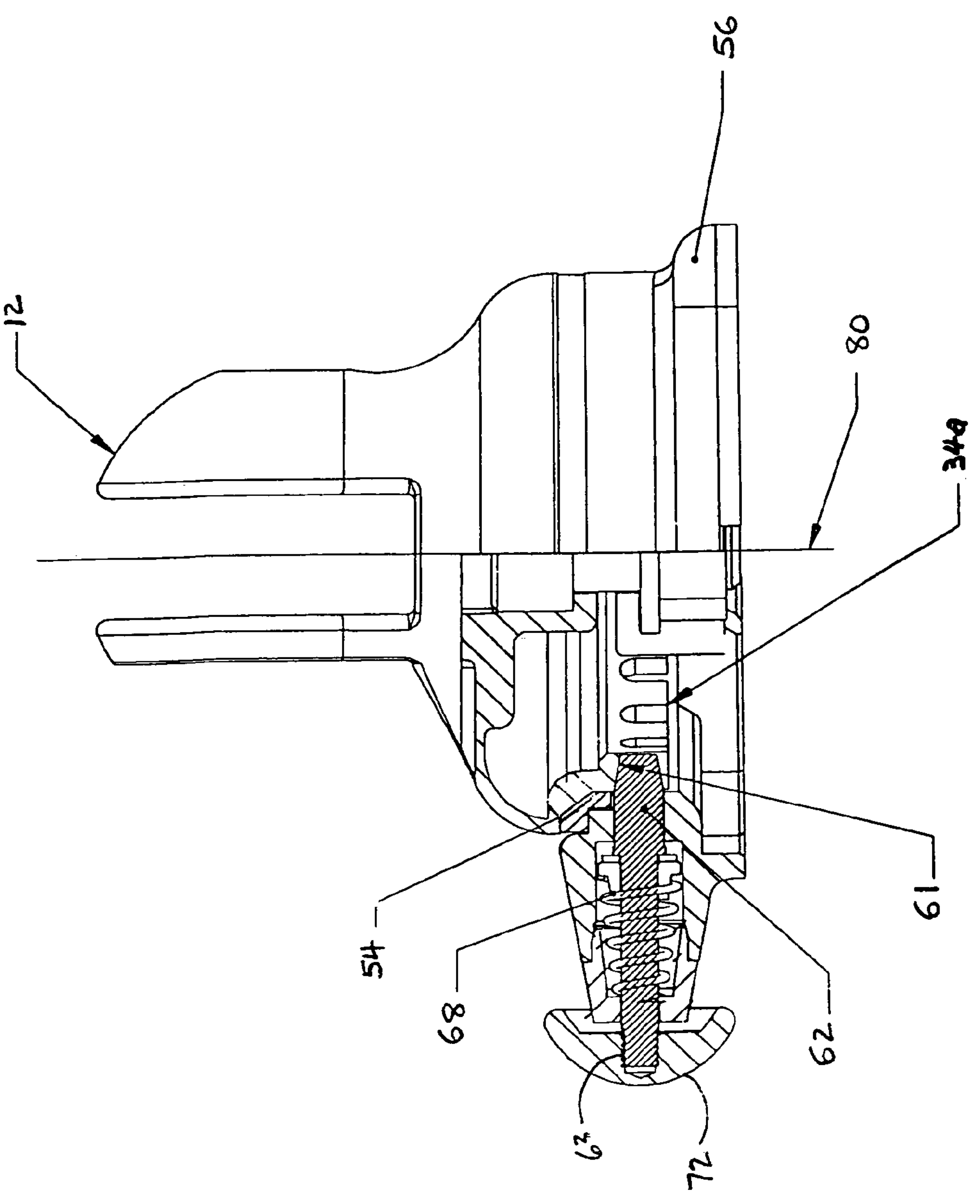
FIG. 2 is a partially sectioned front view illustration of the present invention of FIG. 1.

Adjustable head 12 is further operationally engaged to baseplate 56, as mentioned above, through adjustable headbolt 38. A portion of adjustable headbolt 38 passes through adjustable head 12 and headbolt bore 58, engaging a washer 74 and a locknut 76 positioned underneath baseplate 56. Headbolt bore 58 and locknut 76 are sufficiently tightened together so as to form an adequate fit between adjustable head 12, seating washer 54, and baseplate 56. Additionally, as shown in FIG. 2, seating washer 54 can be tapered so as to permit a greater degree of alignment and a tighter fit of adjustable head 12 to base plate 56, due to the inclination of the tapers of seafed washer 54. A base plate spacer 78 can be used to position baseplate 56 above a substrate, such as a boat structure. Prior to securing baseplate 56 to adjustable head 12, a tapered pin 62 is inserted into tapered pin bore 60 of baseplate 56.

Tapered pin 62 accommodates a washer 64, secures a shoulder bushing 66, and further accommodates a slide pull spring 68. Slide pull spring 68 is secured to shoulder bushing 66, and is further secured to pin retainer 70. A slide pull knob 72 is secured to pin retainer 70. In operation, as further detailed below, slide pull knob 72 is utilized by a user to cause tapered pin 62 to engage and disengage spaces 34*b* between teeth 34*a*.

Figure 3:
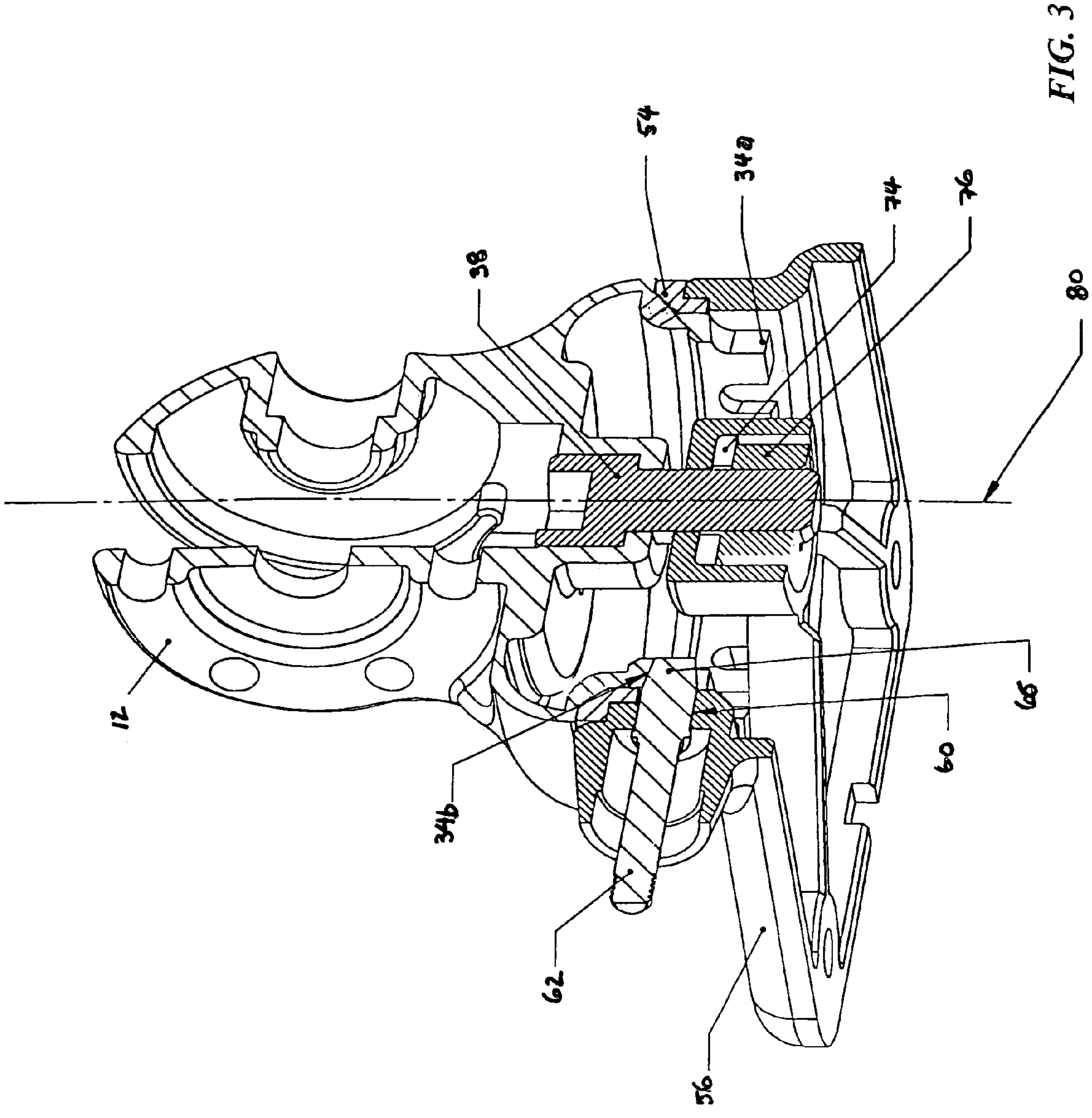
FIG. 3 is a sectioned isometric view illustration of the present invention of FIG. 1.

Referring now to FIGS. 2 and 3, adjustable head 12 is illustrated engaging baseplate 56 and tapered pin 62. As further shown in FIGS. 2 and 3, tapered pin 62 operatively engages spaces 34*b* between teeth 34*a*. The engagement between tapered pin 62 and spaces 34*b* prevents undesired rotation of adjustable head 12 about rotation axis 80 (horizontal rotation). The tapering of tapered pin 62 allows for a better fit due to the varying size of the taper, and, additionally, wears better than more traditional round pins which increase the size of the opening they mate to over time. Furthermore, teeth 34*a* may be tapered as well, thus wearing consistently with tapered pin 62. In operation, spring 68 is under constant tension in its resting state sufficient enough to propel tapered nose 65 of tapered pin 62 into space 34*b* between teeth 34*a*. In order to prevent tapered pin 62 from extending to far into space 34*b*, a tapered cavity 61 is provided. The tapered shape of tapered cavity 61 preferably compliments the tapered shape of tapered nose 65 of tapered pin 62, thus providing a stopping point that prevents tapered pin 62 from entering to far into space 34*b*.

Additionally, tapered pin 62 is movable out of space 34*b*. In order to do so, a user applies a pulling force on pull knob 72. By pulling on pull knob 72, tapered pin 62 is likewise pulled out of space 34*b*.

By way of example, tapered pin 62 can include a threaded portion 63 that mates with a threading in pull knob 72, thereby permitting the applied pull force on pull knob 72 to be transmitted to tapered pin 62. Once the appropriate amount of pull force has been applied to cause tapered pin 62 to exit a space 34*a*, the user can rotate adjustable head 12 about rotation axis 80 (horizontal rotation) to a desired position. Once adjustable head 12 is placed in the desired position, the user ceases the application of the pull force on pull knob 72, causing spring 68 to return to its resting state and propelling tapered pin 62 into a space 34*b* corresponding to the new desired position of adjustable head 12.

Figure 4A:
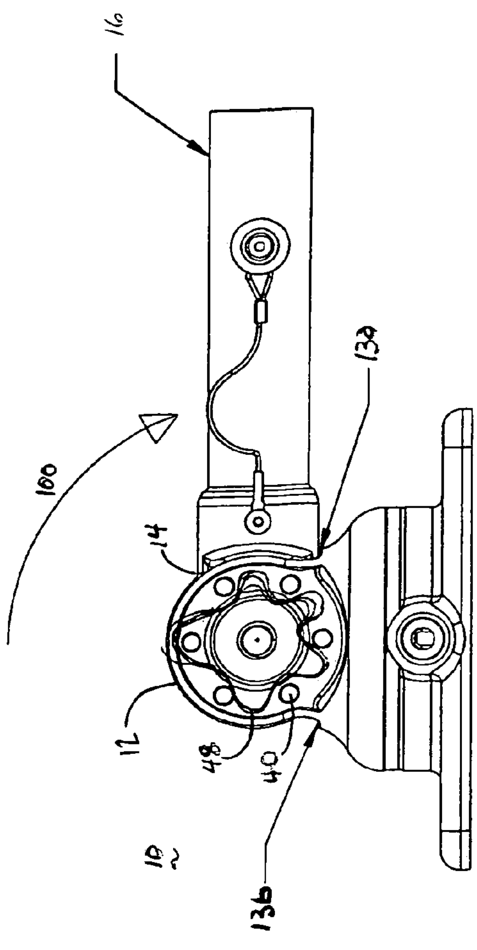
FIG. 4*a* is a side view illustration of the present invention of FIG. 1.
Figure 4B:
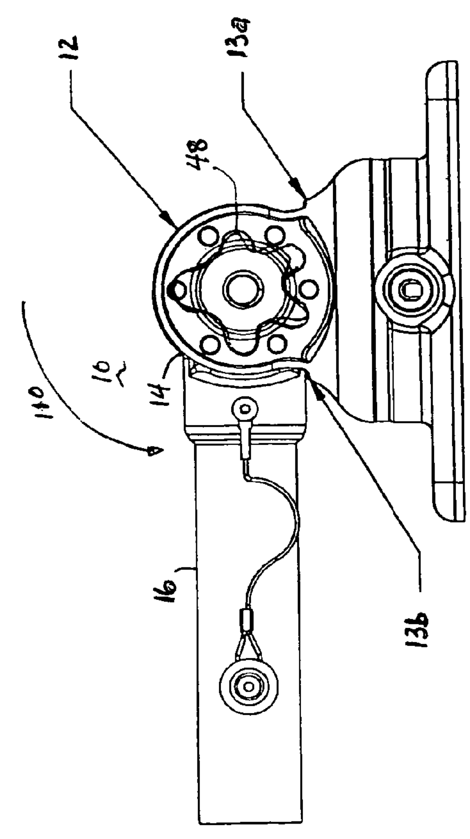
FIG. 4*b* is an alternative side view illustration of the present invention of FIG. 4*a*.

Referring now to FIGS. 4*a* and 4*b*, the operative engagement between adjustable head 12 and arm adapter 14 is illustrated. As described above, once threaded lobe knob 48 is sufficiently loosened, bullets 40 are similarly loosely positioned within detents 29 (shown in FIG. 1). When sufficiently loose within detents 29, bullets 40 permit arm adapter 14 to rotate about an axis perpendicular to rotation axis 80 (vertical rotation) of FIGS. 2 and 3. In this way, the user can rotate support tube 16, and any attached accessory, into a desired position. The rotation of arm adapter 14 and associated support tube 16 is halted by stop shoulders 13*a* and 13*b*. Stop shoulders 13*a* and 13*b* respectively form stopping points for the rotation of arm adapter 14 and associated support tube 16 in a particular direction by preferably contacting arm assembly 14 and interrupting the rotation of arm assembly 14.

By way of further example, as is shown in FIG. 4*a*, as arm adapter 14 is rotated in a first direction 100, the rotation is halted by stop shoulder 13*a*. Likewise, as arm adapter 14 is rotated in a second direction 110, the rotation is halted by stop shoulder 13*b*. Preferably, the rotation (vertical rotation) of arm adapter 14 and associated support tube 16 can be between 0° and 180° off of rotation axis 80. It is contemplated, however, that further degrees of rotation can be employed, limited only by contact the might occur between support tube 16 and a substrate that adjustable top mount 10 is mounted upon.

Figure 5:
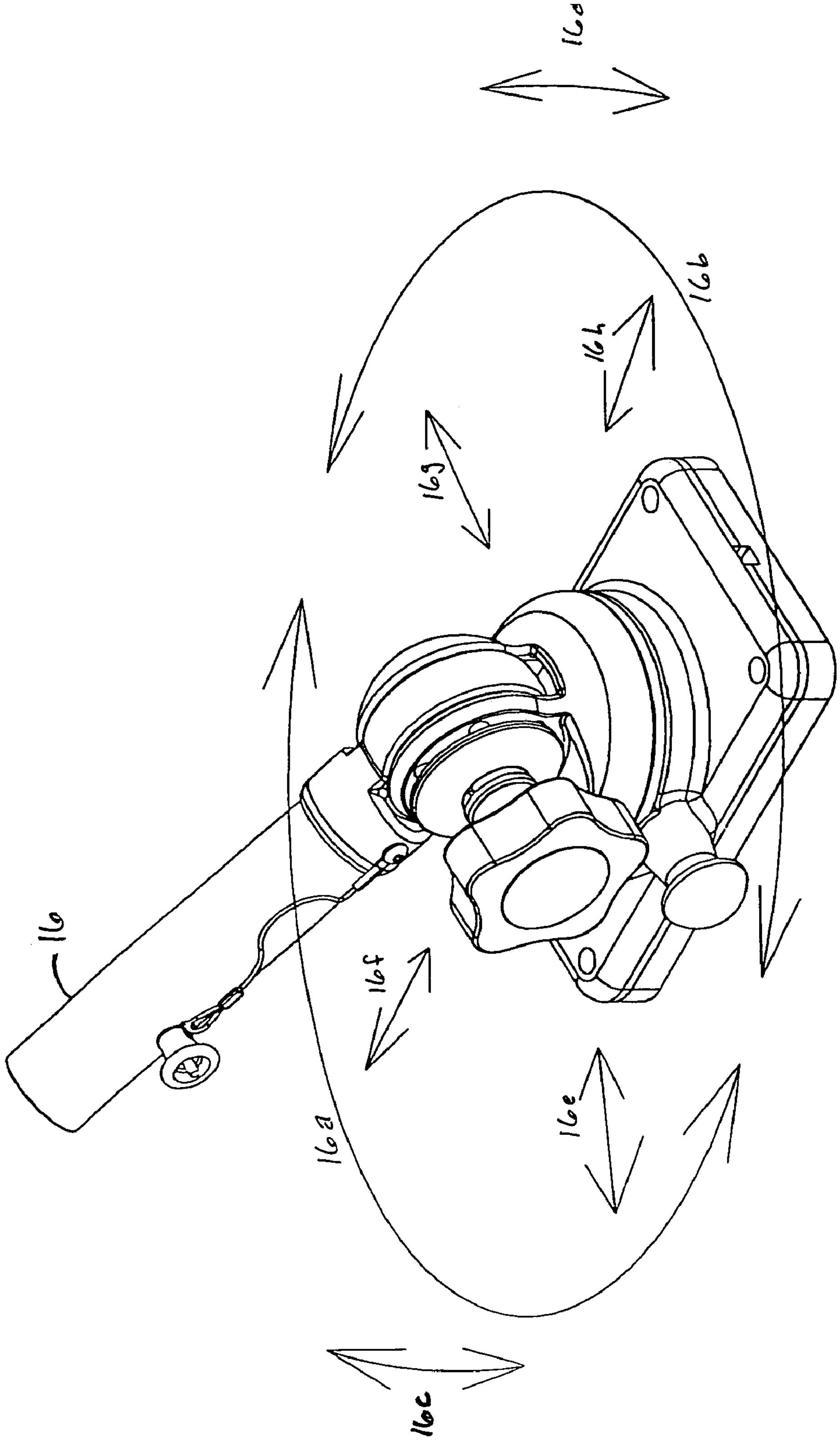
FIG. 5 is an isometric view illustration of the present invention of FIG. 1.

With respect to positioning of support tube 16, FIG. 5 illustrated the preferred ranges of motion, 16*a*, 16*b*, 16*c*, 16*d*, 16*e*, 16*f*, 16*g*, and 16*h*.

Figure 6:
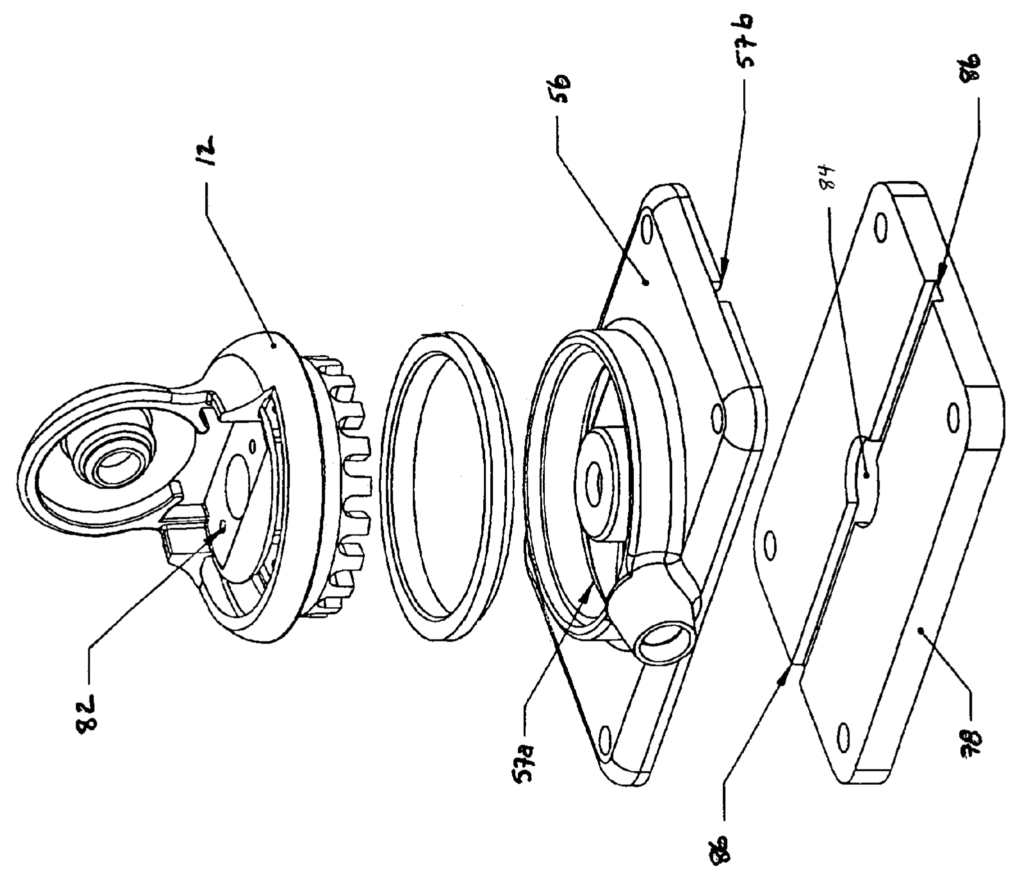
FIG. 6 is an exploded isometric view illustration of the drainage system of the present invention of FIG. 1.

Referring now to FIG. 6, a drainage system for the removal of moisture from the present invention is illustrated. As is shown in FIG. 6, adjustable head 12 incorporates drainage holes direct moisture from adjustable head 12 into drainage area 57*a* of baseplate 56. Baseplate 56 further includes at least one baseplate drainage slot 57*b* for the movement of moisture out of an area internal to baseplate 56. If baseplate spacer 78 is used, at least one baseplate drainage slot is aligned over a respective baseplate spacer drainage slot 86, which is preferably further connected to a drainage cavity 84, so that moisture can be removed to the atmosphere outside of baseplate 56.

Figure 7:
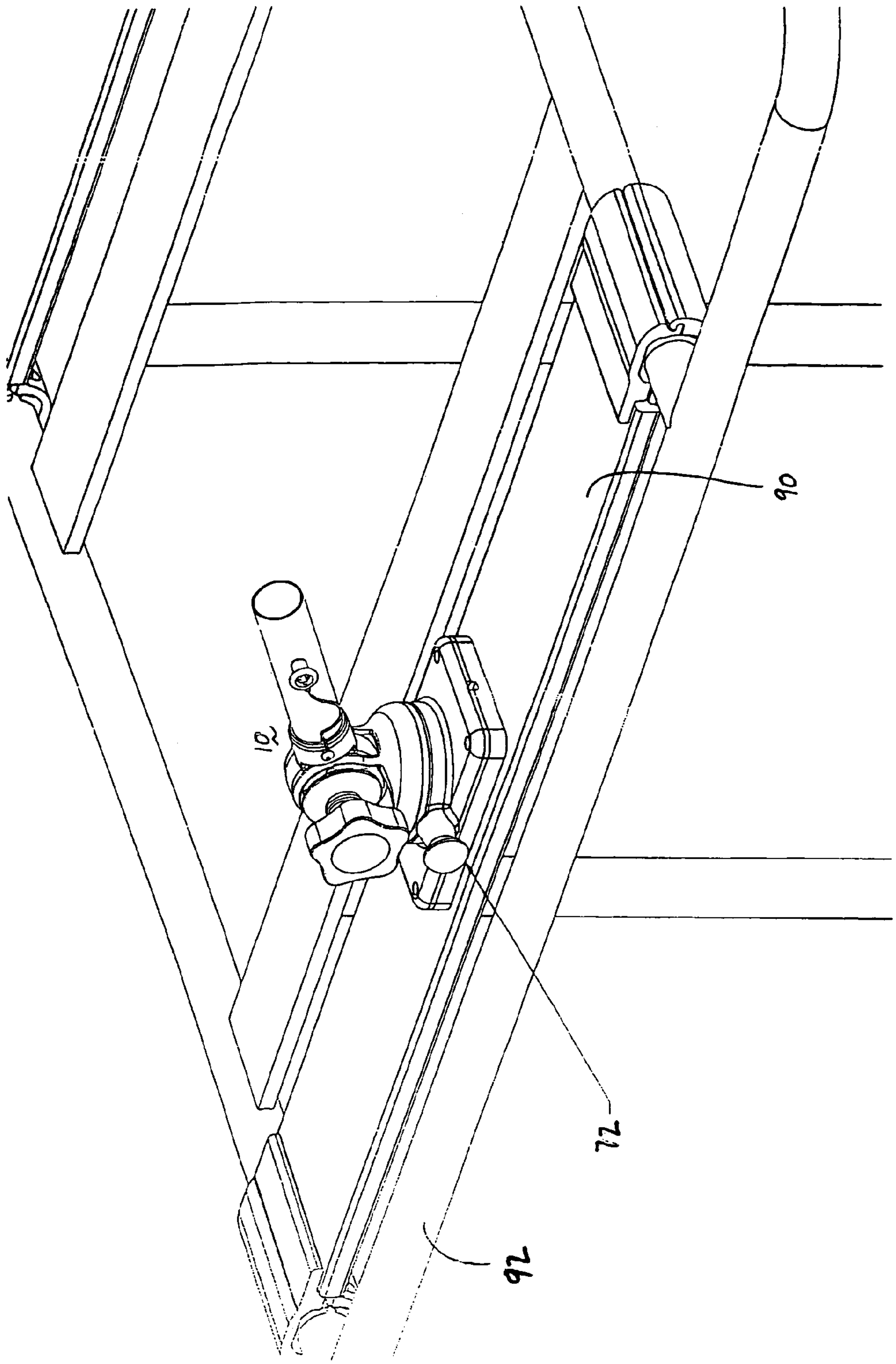
FIG. 7 is an isometric view illustration of the present invention of FIG. 1 mounted to a substrate.

Referring now to FIG. 7, the preferred embodiment of adjustable top mount 10 is illustrated mounted to a substrate 90. Preferably, mounting substrate 90 is a support plate that can be clamped (as shown) or welded to a tube frame 92. In this way, adjustable top mount 10 can be free from interfering with the user or others in the area. More preferably, adjustable top mount 10 is mounted to a substrate, such as mounting substrate 90, in a manner that facilitates ease in operation for the user. For example, it may be preferred that adjustable top mount 10 be mounted in an orientation that positions pull knob 72 towards an area external to tube frame 92. It is contemplated that other orientations are possible, based upon the structure and nature of tube frame 92, or other mounting scheme.

Although only a few exemplary embodiments of the present invention have been described in detail above and in the following Figures, those skilled in the art will readily appreciate that numerous modifications to the exemplary embodiments are possible without materially departing from the novel teachings and advantages of this invention. Accordingly, all such modifications are intended to be included within the scope of this invention as defined in the following claims.

What is claimed is:

1. An adjustable top mount, comprising:

an arm adapter having a support tube constructed for receiving an outrigger boom;

an adjustable head constructed for receiving said arm adapter, said adjustable head having teeth separated by spaces;

a knob assembly operatively engaging said adjustable head, said knob assembly releasably securing said arm adapter in a position selected from a plurality of positions;

a baseplate operatively engaging said adjustable head; and a pin slidably positioned within a portion of said baseplate, said pin releasably engaging said teeth and releasably movably positioned in a space of said spaces.

2. The adjustable top mount according to claim 1 wherein said adjustable head includes a pivot bolt bore.

3. The adjustable top mount according to claim 2 wherein said arm adapter includes a pivot bolt bore.

4. The adjustable top mount according to claim 3 wherein said pivot bolt bore of said adjustable head aligns with said pivot bolt bore of said arm adapter.

5. The adjustable top mount according to claim 4 wherein said aligned pivot bolt bores receive a pivot bolt there through.

6. The adjustable top mount according to claim 1 wherein said knob assembly includes at least one bullet.

7. The adjustable top mount according to claim 6 wherein said at least one bullet passes through a detent bore in said adjustable head.

8. The adjustable top mount according to claim 7 wherein said at least one bullet is received by a detent in said arm adapter.

9. The adjustable top mount according to claim 1 wherein said baseplate includes at least one baseplate drainage slot.

10. The adjustable top mount according to claim 1 wherein said pin is tapered.

11. The adjustable top mount according to claim 10 wherein said tapered pin is releasably engaged to said teeth in a resting state.

12. The adjustable top mount according to claim 10 wherein said tapered pin operatively engaged to a spring.

13. The adjustable top mount according to claim 12 wherein said rotation is 360° about a rotation axis.

14. The adjustable top mount according to claim 13 wherein said rotation is about an axis perpendicular to said rotation axis.

15. The adjustable top mount according to claim 1 wherein said adjustable head is rotatable.

16. The adjustable top mount according to claim 15 wherein said arm adapter is rotatable.

17. The adjustable top mount according to claim 16 wherein said rotation is less than 360° about said axis perpendicular to said rotation axis.

* * * * *